(12) United States Patent
Skuro

(10) Patent No.: US 7,344,243 B2
(45) Date of Patent: Mar. 18, 2008

(54) CARTRIDGE ASSEMBLY FOR A RETRACTABLE EYEWEAR RETAINER STRAP

(76) Inventor: John Michael Skuro, 2033 Lone Pine Rd., Virgina Beach, VA (US) 23451

( * ) Notice: Subject to any disclaimer, the term of this patent is extended or adjusted under 35 U.S.C. 154(b) by 0 days.

(21) Appl. No.: 11/593,866

(22) Filed: Nov. 4, 2006

(65) Prior Publication Data

US 2007/0103638 A1 May 10, 2007

Related U.S. Application Data

(60) Provisional application No. 60/733,189, filed on Nov. 4, 2005.

(51) Int. Cl.
G02C 3/00 (2006.01)
(52) U.S. Cl. .......................... 351/156; 351/157; 351/111
(58) Field of Classification Search ................ 351/111, 351/156–158
See application file for complete search history.

(56) References Cited

U.S. PATENT DOCUMENTS

| | | | | |
|---|---|---|---|---|
| 6,547,388 B1* | 4/2003 | Bohn | ........................ | 351/118 |
| 6,905,206 B2* | 6/2005 | Skuro | ........................ | 351/118 |
| 2004/0051845 A1* | 3/2004 | Steere | ........................ | 351/157 |

\* cited by examiner

*Primary Examiner*—Huy Mai
(74) *Attorney, Agent, or Firm*—John M. Brandt

(57) ABSTRACT

An improved mechanism for extending and retracting a retainer strap for eyewear. The strap is disposed in a cartridge unit such as a box like container which may be inserted into the interior of one or both hollow temples of an eyeglass frame. Alternatively, the strap containing cartridge may be affixed to the exterior of the temple of any pair of eyewear of sufficient size to support the cartridge. Retainer straps suitable for use with the cartridge may be either elastic, inelastic, or one of each to provide for different modes of use.

6 Claims, 3 Drawing Sheets

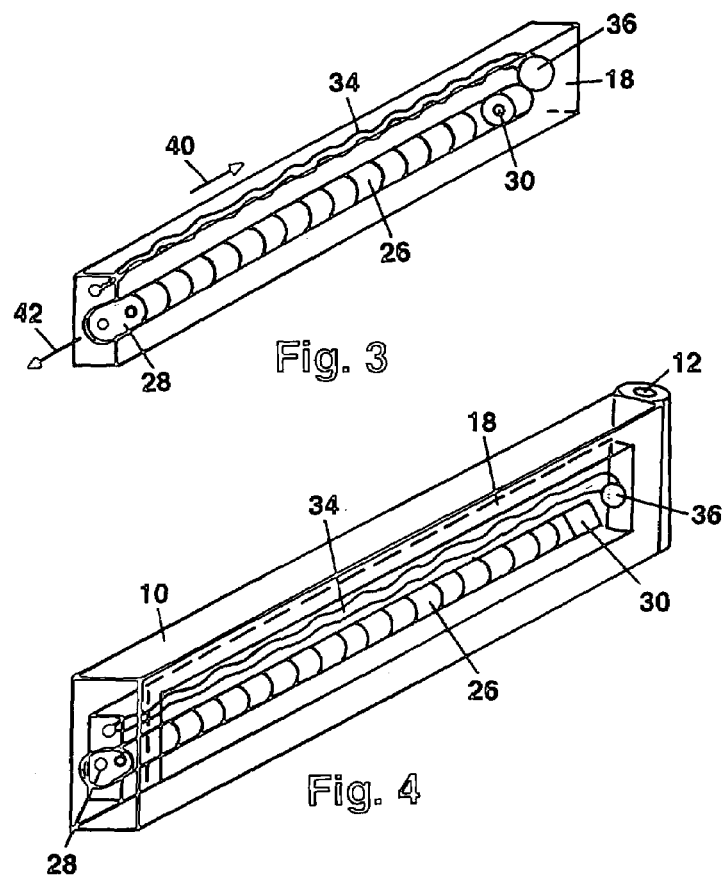
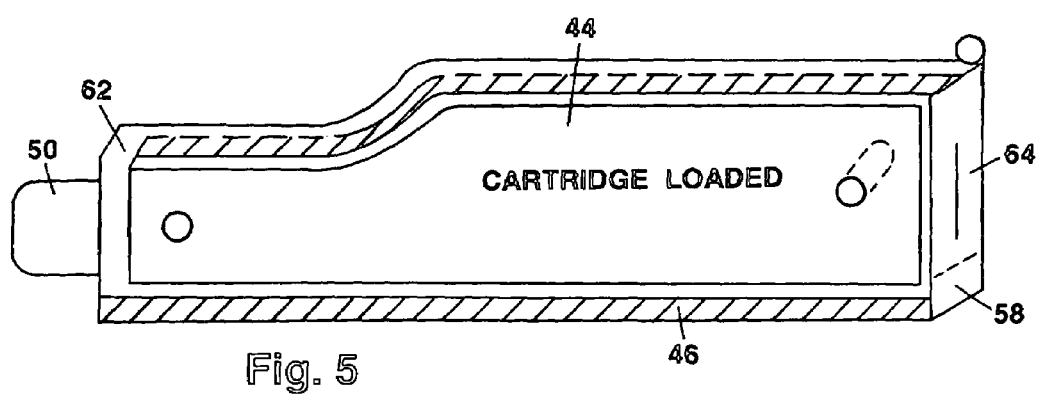

CARTRIDGE ASSEMBLY FOR A RETRACTABLE EYEWEAR RETAINER STRAP

CROSS REFERENCE TO RELATED APPLICATIONS

This application is based on the disclosure of Provisional Application Ser. No. 60/733,189 filed Nov. 4, 2005, which is hereby incorporated by reference.

BACKGROUND OF THE INVENTION

1. Field of the Invention

The invention relates to devices for securing eyewear to the body of a wearer and more particularly relates to retaining straps and strap retracting arrangements disposed in eyewear temples for holding eyewear in place about the head or neck.

2. Description of the Prior Art

Retaining straps for eyewear or eyeglasses are well known in the prior art. Simple string type retainers having loops at each end to engage eyewear temples are readily available. These devices are usually inelastic and are designed to allow the eyewear to be worn about the neck when removed from the head. Elastic retainers are also sold for use in sports activities to keep the eyewear securely attached to the head. Both of the prior art types of elastic and inelastic retainers are separate units which remain external to the eyewear.

U.S. Pat. No. 4,479,703, Enghofer, discloses a retaining assembly wherein the retaining straps are elastic and retract of there own elasticity into hollow temples. U.S. Pat. No. 6,547,388, Bohn, provides a similar device wherein the retaining strap coils about itself and is adjustable as to effective length by various stop mechanisms.

U.S. Pat. No. 6,905,206, Skuro, provides a temple disposed retractable assembly for both elastic and inelastic straps so that both an active mode, i.e., secured to the head, and passive mode, for example, around the neck, are available. Additionally, the design of that patent provides for the straps to be completely retracted by an elastic member within the temple when neither form of use is desired.

SUMMARY OF THE INVENTION

The invention may be summarized as an improved mechanism for containing an extendable and retractable retainer strap for eyewear. By eyewear is meant any frame-like device which contains, holds, or supports transparent, clear, colored, and/or corrective lens structures, which frame is supported on the head by the use of temples that fit over the ears. Items such as sunglasses, sight correcting eyeglasses, and safety glasses are all included in the class of eyewear for which the invention is appropriate.

The strap provides a means to secure eyewear to the upper body, particularly the head and/or neck of a person either in a position of use, i.e., the eyewear to affect or augment sight, or in a position where the eyewear is removed from the sight position but held above the head or around the neck to prevent loss.

The improvement consists of mounting the strap and the attendent mechanism for extension and retraction in a cartridge which then may be inserted into a hollow eyewear temple of the appropriate receiving configuration or by attaching the cartridge to the exterior of the temple of any eyewear having temples of sufficient size to support the cartridge.

As was disclosed in my previous above referenced patent, the strap may be elastic or in elastic or inelastic and a single pair of eyewear may combine one or both according to the needs of the user. By mounting or enclosing the strap and its associated components in a separate cartridge, a way is provided to combine the types of straps, elastic and inelastic according to the needs of the user. For example, one strap may be used alone, or two in combination, one on each temple to provide all the variety of positions inherent in the concept. Further, replacement of a broken assembly is facilitated by the ability to replace a particular cartridge which has failed without losing the use of the strap or disposing of the eyewear in its entirety.

The cartridge assembly preferably will consist of a relatively long thin more or less rectangular box which will contain all of the required components for a retainer strap. Manufacture of finished units will be easier than incorporating the components in a specific temple and within the temple support limits mentioned above, allow the extendable and retractable retainer straps to be employed with any existing eyewear rather than be limited to models especially manufactured with the feature.

These, and other features and advantages of the invention will become more evident from the description of the preferred embodiment accompanied by the drawings, which follows.

DESCRIPTION OF THE DRAWINGS

FIG. 3 is a perspective schematic view of the assembled components of the embodiment of FIG. 1;

FIG. 4 is a perspective schematic view of the completely assembled components of the embodiment of FIG. 1;

FIG. 5 is a perspective view of an additional preferred embodiment of the invention;

DESCRIPTION OF THE PREFERRED EMBODIMENT

Figure 1:
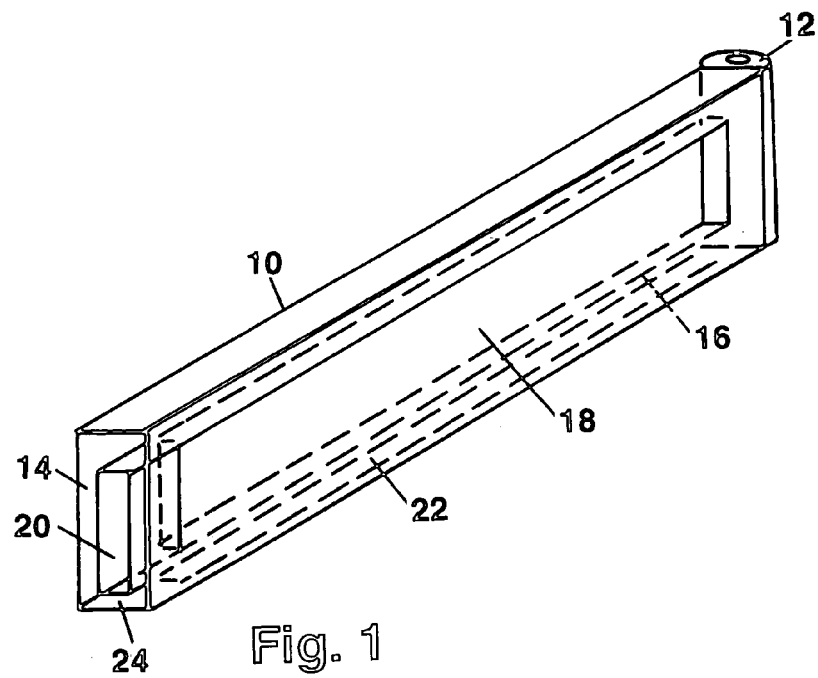
FIG. 1 is a perspective schematic view of a component of the preferred embodiment of the invention.

Referring first to FIG. 1, there is shown a perspective view of a component of the preferred embodiment of the invention in schematic format. Temple 10 is attachable to an eyewear frame, not shown, by hinge 12 and is composed of an outer shell 14 having a hollow inner core 16 into which a thin walled cartridge 18 may be placed. The cartridge may be inserted through temple open end 20 or alternatively through an opening 22 in the bottom 24 of temple 10 and may be held in place by any convenient means, removeable or non-removable, such as a screw or drop of glue.

Figure 2:
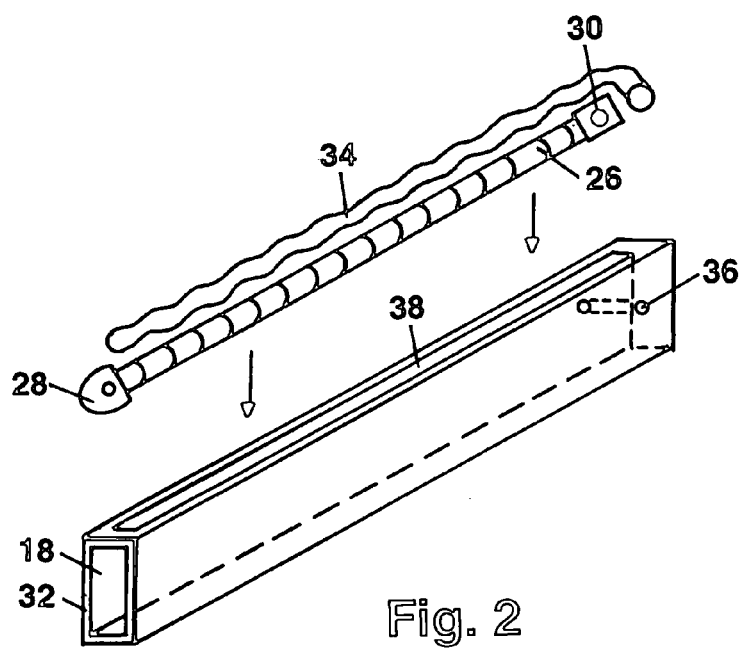
FIG. 2 is a perspective schematic view of additional unassembled components of the embodiment of FIG. 1.
Figure 6:
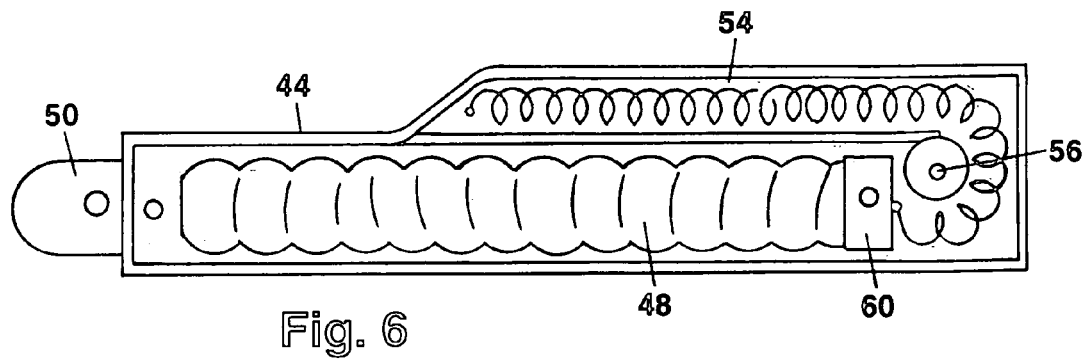
FIG. 6 is a side cross-sectional view of the embodiment of FIG. 5.
Figure 7:
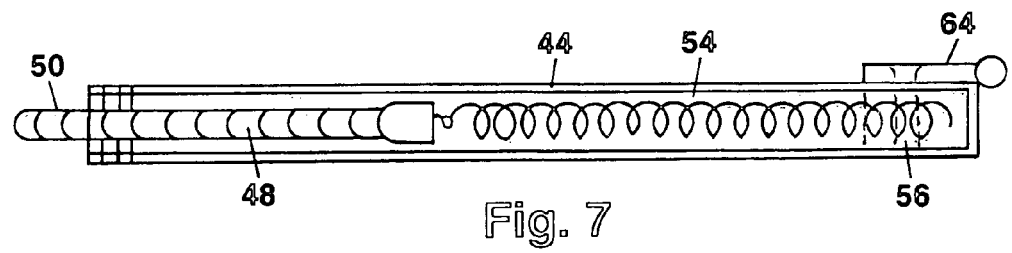
FIG. 7 is a top cross-sectional view of the embodiment of FIG. 5.
Figure 8:
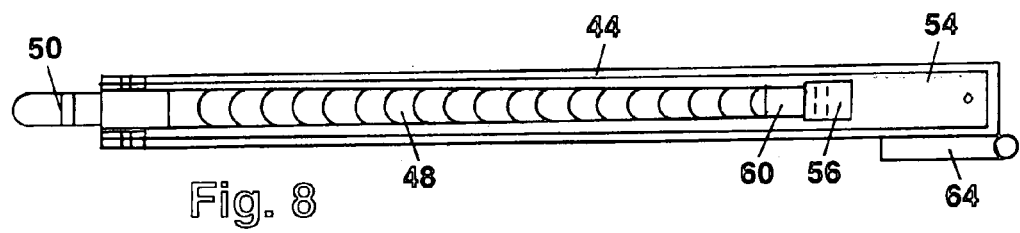
FIG. 8 is a bottom cross-sectional view along lines B-B of FIG. 5.

FIG. 2 illustrates the additional components of the retractable strap assembly which fit in cartridge 18 which is arranged to be disposed within a hollow temple as stated above, or, as will be described below, attached to the exterior of the temple by clips or other appropriate means. As shown, the essential components to fit within the cartridge are an extendable retainer strap 26, either elastic or inelastic, an end connector 28 for securing the extended strap to the opposite temple of the eyewear or a similar strap, extended or not, attached to the temple, locking means 30 for securing the extended strap in place upon withdrawal at end 32 of the temple furthest from the eyewear, retraction device 34 such as an elongated spring or bungee cord, and a pivot such as a bar 36 or pulley for holding the strap at the eyewear end of the temple.

Appropriate arrangements and combinations of straps, locks, retraction devices, and pivots and pulleys are shown more particularly in my U.S. Pat. No. 6,905,206 and my allowed U.S. application Ser. No. 11/398,935.

FIG. 3 shows the above described components assembled in cartridge 18 through, for example, top port 38. The direction of the extension of retraction device 34 during withdrawal is indicated by arrow 40 and the extension of strap 26 by arrow 42. In FIG. 4 the cartridge is shown installed in temple 10 of FIG. 1.

Referring next to FIGS. 5-8, there are shown perspective and cross-sectional side top and bottom views of an additional more detailed embodiment of the invention particularly oriented to the disposal of a cartridge 44 within a hollow eyewear temple 46. In FIG. 5, cartridge 44 is shown installed in temple 46 and in FIGS. 6-8, the components comprising an extendable retainer strap combination consisting of a retainer strap 48, an end connector 50, locking means 52, retraction means 54, a coiled spring for example, and a pivot 56 for holding retraction means 54 and strap 48 at the eyewear end 58 of temple 56, are illustrated. Locking block 60 provides the means to hold strap 48 in an extended position at temple end 62. Hinge 64 is used to attach temple 46 to an eyewear frame not shown.

Figure 9:
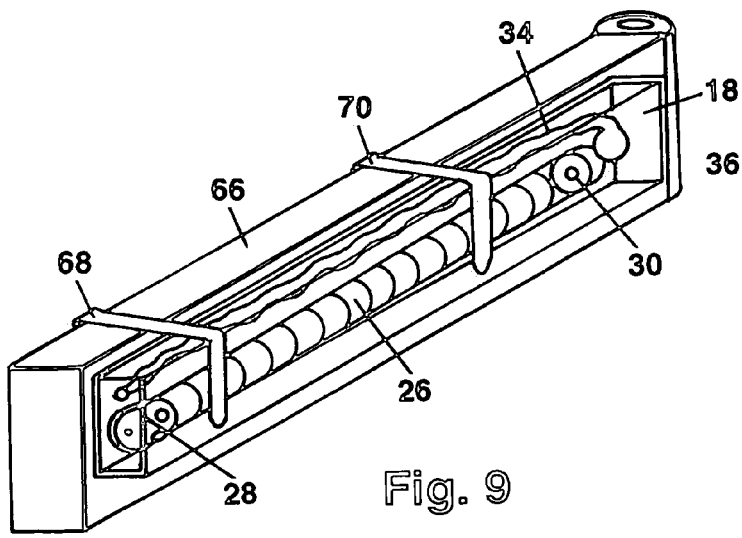
FIG. 9 is a perspective illustration of the invention in an alternative mode of use.

Referring next to FIG. 9, the use of the cartridge of the invention attached to the exterior of an eyewear temple 66 is shown. A cartridge assembly, such as that illustrated in FIG. 3, is secured to the exterior of the temple by clips 68 and 70 or any other suitable device or means such as an adhesive, VELCRO fasteners, or elastic bands.

As variations in the above described preferred embodiments may be made within the general concept of the disclosure, the invention is accordingly defined by the following claims.

What is claimed is:

1. An extendable retractable eyewear retainer strap cartridge assembly attachable to a temple of an eyewear frame comprising in combination:
   A. a mounting assembly comprising a substantially rectangular box having first and second ends, first and second sides, third and fourth sides comprising a top and bottom, said mounting assembly having a first port in one of said ends and a second port in one of said sides, said ports providing substantial access to the interior of said mounting assembly;
   B. an extendable eyewear retainer strap disposed within said assembly, said strap having a withdrawable end withdrawable from one end of said cartridge assembly through said first port;
   C. means to retract said strap into said mounting assembly; and
   D. fastening means attached to said withdrawable end of said eyewear retainer strap, said fastening means attachable to said eyewear.

2. The cartridge assembly of claim 1 wherein said assembly is attachable to the exterior of said temple.

3. The cartridge assembly of claim 1 wherein said temple is hollow and said cartridge assembly is disposable within said temple.

4. A retractable eyewear retaining strap assembly for an eyewear frame comprising in combination:
   A. a hollow temple having a strap receiving end and an eyewear frame attachable end hingeably attachable to said frame, said temple having a first longitudinal passageway disposed in one side of said temple, said passageway communicating between the interior and exterior of said temple, said passageway extending substantially the length of said temple; said temple having a second longitudinal passageway disposed at the strap receiving end of said temple, said passageway communicating between the interior and exterior of said temple, said passageway extending substantially the width of said temple;
   B. a cartridge mounting assembly disposed in said temple comprising a substantially rectangular box having first and second ends, first and second sides, third and fourth sides comprising a top and bottom, said mounting assembly having a first port in one of said ends and a second port in one of said sides, said ports providing substantial access to the interior of said mounting assembly;
   C. an extendable eyewear retainer strap disposed within said assembly, said strap having a withdrawable end withdrawable from one end of said cartridge assembly through said first port and through said temple through said second longitudinal passageway;
   D. means to retract said strap into said mounting assembly; and
   E. fastening means attached to said withdrawable end of said eyewear retainer strap, said fastening means attachable to said eyewear.

5. The assembly of claim 4 wherein said strap is elastic.

6. The assembly of claim 4 wherein said strap is inelastic.

* * * * *